United States Patent [19]

Hung et al.

[11] Patent Number: 5,164,078
[45] Date of Patent: Nov. 17, 1992

[54] PROCESS FOR REMOVAL OF CALCIUM FROM A HYDROCARBON FEEDSTOCK

[75] Inventors: Chi W. Hung, San Rafael; Bruce E. Reynolds, Martinez, both of Calif.

[73] Assignee: Chevron Research and Technology Company, San Francisco, Calif.

[21] Appl. No.: 837,684

[22] Filed: Feb. 18, 1992

Related U.S. Application Data

[63] Continuation of Ser. No. 561,021, Aug. 1, 1990, abandoned, which is a continuation-in-part of Ser. No. 457,996, Dec. 28, 1989, abandoned, which is a continuation-in-part of Ser. No. 458,128, Dec. 28, 1989, abandoned.

[51] Int. Cl.$^5$ ............... C10G 45/60; C10G 45/00
[52] U.S. Cl. ............... 208/251 H; 208/213; 208/251 R; 208/254 H; 208/253
[58] Field of Search ............... 208/251 H

[56] References Cited

U.S. PATENT DOCUMENTS

| | | | |
|---|---|---|---|
| 3,948,759 | 4/1976 | King et al. | 208/251 H |
| 4,003,823 | 1/1977 | Baird et al. | 208/251 H |
| 4,003,824 | 1/1977 | Baird et al. | 208/251 H |
| 4,051,015 | 9/1977 | Bearden, Jr. et al. | 208/251 H |
| 4,120,786 | 10/1978 | Morimoto et al. | 208/251 H |
| 4,354,927 | 10/1982 | Shih et al. | 208/251 H |
| 4,430,206 | 2/1984 | Rankel | 208/251 H |
| 4,447,317 | 5/1984 | Miller et al. | 208/251 H |
| 4,534,101 | 9/1985 | Oleck et al. | 208/251 H |
| 4,582,595 | 4/1986 | Audeh et al. | 208/251 H |
| 4,606,812 | 8/1986 | Swanson | 208/251 H |
| 4,613,425 | 9/1986 | Higashi et al. | 208/251 H |
| 4,619,759 | 10/1986 | Myers et al. | 208/251 H |
| 4,657,663 | 4/1987 | Gardner et al. | 208/251 H |
| 4,657,664 | 4/1987 | Evans et al. | 208/251 H |
| 4,671,866 | 6/1987 | Coombs et al. | 208/251 H |
| 4,741,821 | 5/1988 | Hung et al. | 208/251 H |
| 4,744,888 | 5/1988 | Hung et al. | 208/251 H |
| 4,761,220 | 8/1988 | Beret et al. | 208/251 H |
| 4,789,462 | 12/1988 | Byrne et al. | 208/251 H |
| 4,830,736 | 5/1989 | Hung et al. | 208/251 H |
| 4,853,109 | 8/1989 | Reynolds et al. | 208/252 |

*Primary Examiner*—Helane Myers

[57] ABSTRACT

We disclose a process for removing calcium from a hydrocarbon feed having at least 1 ppm oil-soluble calcium. It comprises employing a catalyst layer characterized as a fixed bed of catalyst particles, a high volume percent of their pore volume in the form of macropores above 1000 Angstrom in diameter, or an average mesopore diameter of 100–800 Å, low surface area, and low hydrogenation activity, and the inclusion of Group I metals, in particular potassium, on the catalyst base.

22 Claims, 2 Drawing Sheets

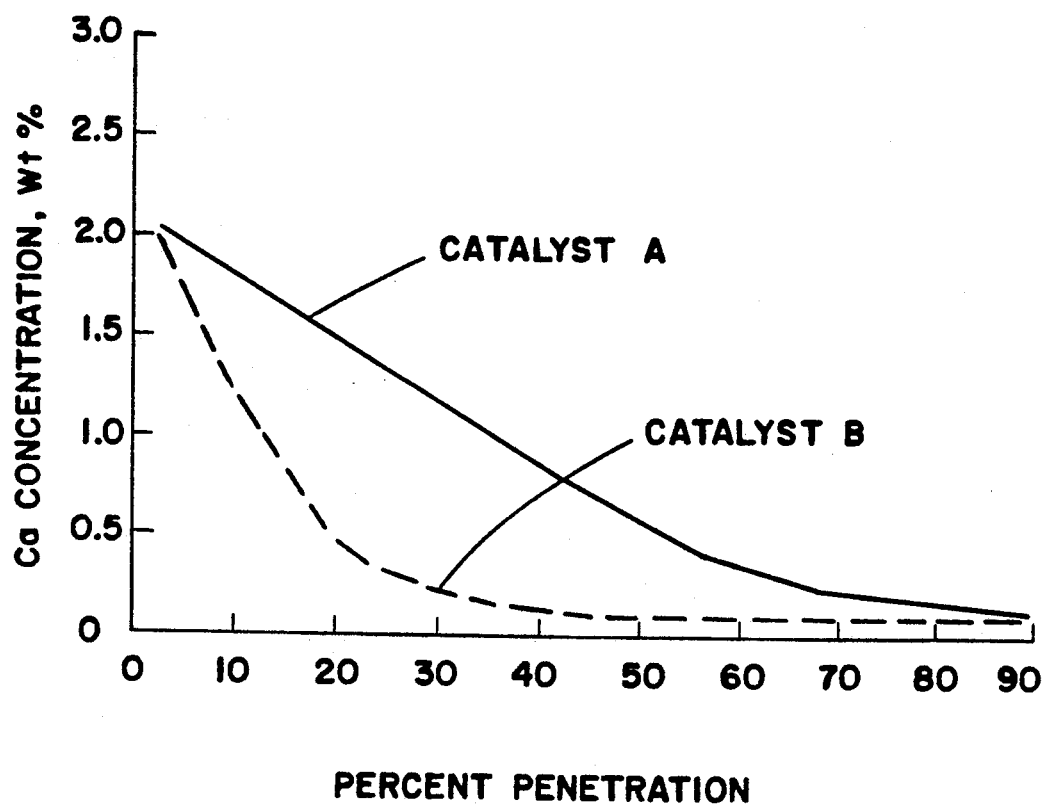
FIG_1

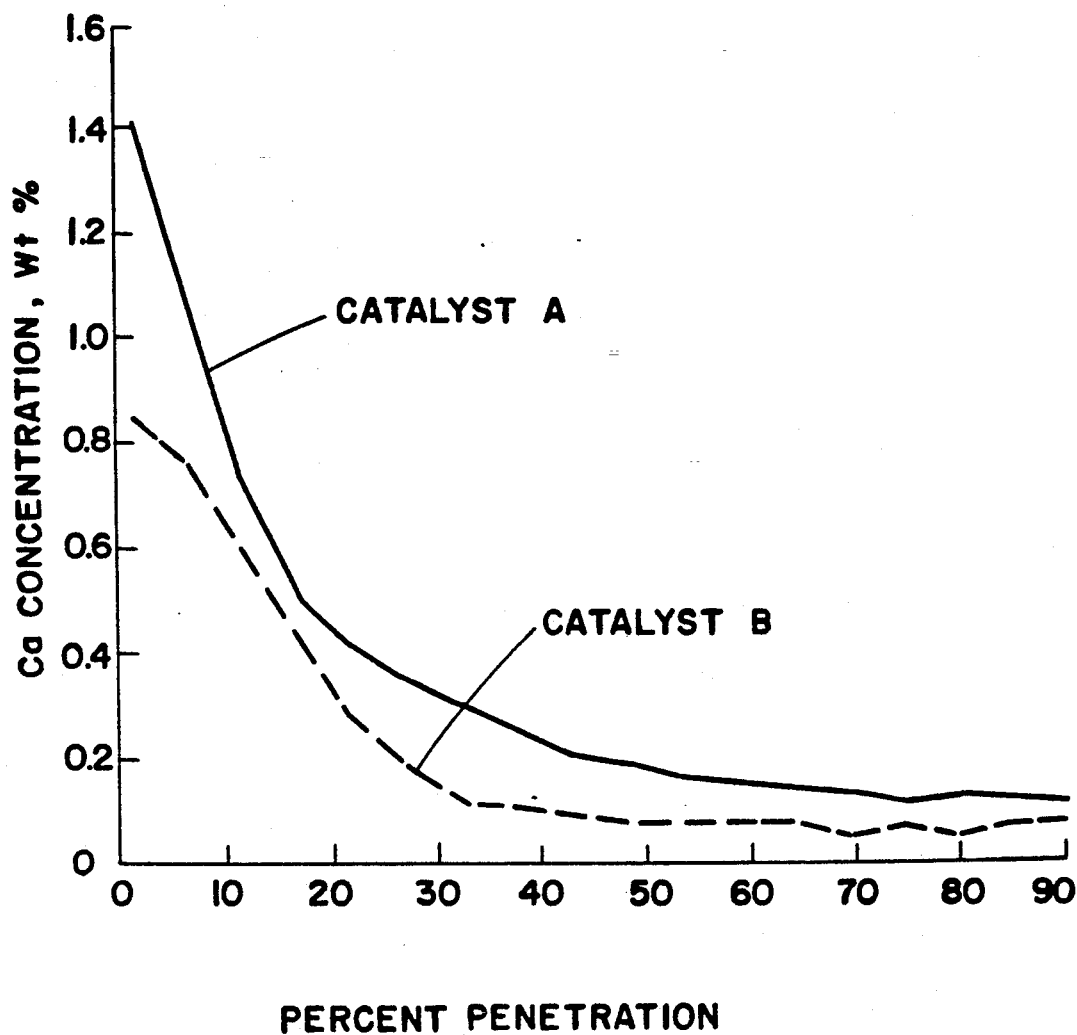
FIG_2

PROCESS FOR REMOVAL OF CALCIUM FROM A HYDROCARBON FEEDSTOCK

This application is a continuation of application Ser. No. 561,021, filed Aug. 1, 1990, now abandoned, which is in turn a continuation-in-part of applications Ser. No. 457,996, filed Dec. 28, 1989, and Ser. No. 458,128, filed Dec. 28, 1989, both now abandoned.

BACKGROUND OF THE INVENTION

The present invention relates to a process for removing calcium from a hydrocarbon feedstock. It is in general terms a hydrodemetalation process using a fixed bed catalyst system, and, more particularly, comprises employing a layer of catalyst particles characterized as having a high volume percent of their pore volumes in the form of macropores, having a low surface area, and a low hydrogenation activity.

A few, but increasingly important, petroleum crude feedstocks, residua, and deasphalted oil derived from them, contain levels of calcium and sodium which render them difficult, if not impossible, to process using conventional refining techniques. The metals contaminants causing particular problems are in the form of generally oil-soluble organometallically-bound compounds including metal naphthenates. These species have been attributed to either naturally occurring metal complexes or solubilized metal compounds from recovery waters which comes in contact with crude oils. These compounds are not separated from the feedstock by normal processes, such as desalting, and in a conventional refining technique they can cause the very rapid deactivation of hydroprocessing catalysts. Examples of feedstocks demonstrating objectionably high levels of calcium compounds are crudes from China, such as Shengli No. 2, and those from the San Joaquin Valley in California, generally contained in a pipeline mixture referred to as San Joaquin Valley crude or residuum.

The problems presented by oil-soluble calcium and sodium in petroleum feedstocks and the necessity for their removal have only been recently appreciated, and the prior art contains relatively few references to its removal. U.S. Pat. No. 4,741,821, Hung et al. teaches a process for the use of a catalyst containing nickel to facilitate the calcium removal. U.S. Pat. No. 4,830,736, Hung et al. also teaches a similar system for the removal of both calcium and sodium. U.S. Pat. No. 4,744,888 discloses a catalyst system which facilitates sodium removal.

U.S. Pat. Nos. 4,853,109, 4,778,589, 4,778,591, 4,789,463, 4,778,590, 4,778,592 and U.S. Ser. Nos. 222,472, and 239,152, all commonly assigned to the assignee of the present invention, disclose various sequestering agents including aminocarboxylic acids, hydoxocarboxylic acids, dibasic carboxylic acids, carbonic acid, monobasic carboxylic acids, sulfuric acid, and their salts, are used for the aqueous extraction of nonporphyrin organometallic contaminants from hydrocarbonaceous feedstocks. The disclosures of all the aforementioned patents and applications are incorporated herein by reference.

In recent years, workers in the field of metals removal have developed hydrodemetalation (HDM) catalysts to protect the more active hydrodesulfurization, hydrodenitrification, or hydrocracking catalysts. Generally, the HDM catalyst contacts the contaminated feed and the metals are deposited before the feed continues through the catalyst bed contacting the active catalysts. In particular, complicated schemes of grading varieties of catalysts which differ in pore size, support composition, and metals loading can result in more efficient use of the individual catalysts.

Most grading schemes involve contacting the hydrocarbon feedstock with catalyst having large pores designed for metals capacity followed by catalysts with smaller pores and more catalytic metals to remove sulfur and other organic metals. In this way the contaminated feed initially contacts a less active catalyst, thereby allowing the feed to penetrate the catalyst more fully before metal deposition occurs. As the less contaminated feed continues through the catalyst bed, it contacts more active catalysts which promote the deposition of sulfur and other organic metals. Thus, for any given feedstock containing metals that penetrate to the interior of the catalyst, such as nickel and vanadium, there will be an ideal grading of catalyst which will result in the most efficient use of these catalysts from the top of the reactor to the bottom.

Workers in the field encounter a more complex problem when metals such as calcium or iron are present as in an oil-soluble form. In contrast to nickel and vanadium which deposit near the external surface of the catalyst particles, these metals can deposit preferentially in the interstices, i.e., void volume, among the catalyst particles, particularly at the top of the hydrogenation catalyst bed. This results in drastic increases in pressure drop through the bed and effectively plugs the reactor.

Conventional processes, which remove nickel, vanadium, and iron, generally have decreasing macroporosity and increasing mesoporosity in the direction of feed flow through the graded bed. The term "macropore" is used in the art and is used herein to mean catalyst pores or channels or openings in the catalyst particles greater than about 1000 Angstrom in diameter. Such pores are generally irregular in shape and pore diameters are used to give only an approximation of the size of the pore openings. The term "mesopore" is used in the art and used herein to mean pores having an opening of less than 1000 Angstrom in diameter. Mesopores are, however, within the range of less than 1000 Angstrom in diameter.

Previous workers found macroporosity to be strongly related to the capacity of catalyst particles to retain heavy metals removed from contaminated hydrocarbon feed. In the following catalyst zones, they prefer predominantly mesoporous catalysts. They found these catalysts to have substantially higher catalytic activity for hydrogenation compared to catalysts having lower surface areas and substantially a macroporous structure. Thus, they exploited these two phenomena to remove heavy metals from heavy feedstocks in a graded catalyst system.

In general, we have found that calcium deposits preferentially in the void volume among the catalyst particles. This greatly increases pressure drop through the bed and results in enormous reactor inefficiencies. In addition, we have found that sodium surprisingly behaves in a manner unlike any other metal encountered thus far. In particular, it deeply penetrates the catalyst particles. So the calcium deposits increase the pressure drop through the catalyst bed while the sodium works to block the active sites within the catalyst particles and deactivates them. As a result of our work, it has become clear that we cannot use conventional graded systems successfully to remove calcium and sodium from a hydrocarbon feedstock containing both of these metals. Thus, it is necessary for us to devise a graded catalyst system, taking into consideration such factors as shape, size, porosity, and surface activity of the catalyst particles that successfully removes both calcium and sodium from the hydrocarbon feedstock. It is an objective of our invention to provide a catalyst system for removing calcium from a hydrocarbon feedstock. It would be advantageous if our catalyst system also removed oil soluble sodium compounds.

SUMMARY OF THE INVENTION

This invention concerns a process for removing calcium from a hydrocarbon feed having at least 1 ppm oil-soluble calcium, employing a fixed bed catalyst system, wherein the catalyst particles of said system comprise: (a) at least 5 volume percent of their pore volume in the form of macropores above 1000 Angstrom in diameter, or have an average mesopore diameter of 100–800Å; (b) a surface area ranging from about 25 $m^2/g$ to about 200 $m^2/g$; and (c) between 0.2 and 10.0 wt. percent of a Group I metal. A preferred Group I metal is potassium and a preferred catalyst support is transition alumina, especially gamma alumina.

Also in accordance with this invention, we disclose a graded fixed bed catalyst system capable of removing calcium and sodium from a hydrocarbon feed having at least 1 ppm calcium and at least 1 ppm sodium. The system comprises at least two catalyst zones characterized as having decreasing porosity, increasing activity, and increasing surface to volume ratio in the direction of feed flow through the graded catalyst system.

BRIEF DESCRIPTION OF THE DRAWINGS

FIGS. 1-2 are graphic representations of calcium concentration versus penetration into the surface of the catalyst of the present invention and comparative non-Group I metal containing catalyst, and demonstrate the superior calcium accumulating effect of the present catalyst with improved penetration into the interior of the catalyst body.

DETAILED DESCRIPTION OF THE INVENTION

According to the present invention, a calcium-containing hydrocarbon feedstock is contacted under hydrodemetalating conditions with a fixed bed catalyst system. The system comprises catalyst particles characterized as having a high volume percent of their pore volume in the form of macropores, a low surface area, low hydrogenation activity, and containing Group I metals, preferably potassium, at a concentration of less than 10% by weight. Preferably, the catalyst bed is layered with catalyst zones of catalyst particles of different average characteristics.

Feedstocks

The feedstocks of this invention can be any hydrocarbonaceous feedstocks that contain dissolved calcium. Significant amounts of nickel, vanadium, and iron may also be present. Ordinarily, preferred feedstocks are those having more than 1 ppm of calcium and more preferably having more than 3 ppm, most preferably having more than 20 ppm. They will typically also contain more than 20 ppm of other metals such as nickel, vanadium, and iron. In addition, they generally contain more than 1.0 wt. % sulfur and more than 2.0 wt. %. The feedstocks suitable for this invention can be crudes, topped crudes, atmospheric or vacuum residua, vacuum gas oil, and liquids from synthetic feed processes, such as liquids from coal, tar sands, or oil shale. For example, we tested two vacuum residua from a double desalted Shengli No. 2 crude oil obtained from the People's Republic of China which contain about 57 ppm of calcium, and about 65 ppm of other heavy metals.

Catalysts

For particular levels of calcium present in the feedstock, we must carefully select parameters such as porosity and hydrogenation activity of the catalyst particles to obtain the desired calcium removal and catalyst utilization.

We determine the pore size distribution within the catalyst particle by mercury porosimetry. The mercury intrusion technique is based on the principle that the smaller a given pore the greater will be the mercury pressure required to force mercury into that pore. Thus, if we expose an evacuated sample to mercury and apply pressure incrementally with the reading of the mercury volume disappearance at each increment, we can determine the pore size distribution. The relationship between the pressure and the smallest pore through which mercury will pass at the pressure is given by the equation:

$$r = -2\sigma \cos\theta / P$$

where,
 r = the pore radius
 $\sigma$ = surface tension
 $\theta$ = contact angle
 P = pressure.

Using pressures up to 60,000 psig and a contact angle of 140°, the range of pore diameters encompassed is 35–10,000 Angstrom.

We characterize the catalysts for use in the process of this invention as having a pore volume distribution of at least 5%, preferably at least 15%, and most preferably at least 20% of its pore volume present in pores having diameters larger than 1000 Angstrom, or an average mesopore diameter ranging from 100–800Å; preferably from 200–400Å; and a surface area ranging from about 25 $m^2/g$ to about 200 $m^2/g$, preferably from about 80 $m^2/g$ to about 150 $m^2/g$, and most preferably from about 100 $m^2/g$ to about 150 $m^2/g$.

In addition, we include metals loaded onto these catalyst supports. In particular, it is preferred to include Group I metals on the catalyst. Preferred Group I metals include sodium and potassium. The preferred metal is potassium. We characterize the catalysts of this invention as having less than 10.0 weight %, preferably 0.2 to 10.0 wt. %, preferably from 1.0 to 5.0 wt. %, and most preferably between 2.0 wt. % and 4.0 wt. % Group I metals impregnated onto the support.

Preparation of Catalysts

We employed an alumina support in preparing catalysts of this invention. They can be prepared by any conventional process. For example, details of preparing alumina supports useful in this invention are fully described in U.S. Pat. No. 4,392,987 to Laine et al., issued Jul. 12, 1983, and U.S. Pat. No. 4,179,408 to Sanchez et al., issued Dec. 18, 1979. Both are incorporated herein by reference.

The preferred support useful in this invention is transition alumina. By the term "transition alumina" is meant the members of the gamma alumina family. These aluminas are less highly calcined than alpha aluminas, and include, for example, gamma alumina, delta alumina, chi alumina, and eta alumina. Gamma alumina is most preferred, in particular gamma alumina having a surface area of 25–200 m$^2$/g, and preferably 80–150 m$^2$/g, and a high volume percent of large pores. By high volume percent of large pores is meant macropores above 1000 Å, or an average mesopore diameter ranging from 100 to 800Å.

The average mesopore diameter is calculated as:

$$\frac{40,000 \times \text{Mesopore Volume, cc/g}}{\text{Surface Area, m}^2/\text{g}}$$

where mesopore volume=total pore volume−macropore volume, and macropores are defined as pores >1000Å.

The Group I catalytic agents used for typical catalysts may be incorporated into the alumina support by any suitable method, particularly by impregnation procedures ordinarily employed in the catalyst preparation art. The preferred catalytic agents for the present invention are Group I metals, including lithium, sodium, potassium, rubidium and cesium. The preferred metal is potassium. The amount of Group I metal (calculated as the pure metal) should be in the range from about 0.2 to about 10.0 wt. % of the composition. They can be incorporated into the catalyst as metal salts, such as nitrates, chlorides, and carbonates. The preferred salts are nitrates. In general, the salts will decompose to the respective oxides upon calcining or under reactor conditions.

Details of incorporating catalytic agents into the alumina support are fully described in U.S. Pat. Nos. 4,341,625, issued Jul. 27, 1982; 4,113,661, issued Sep. 12, 1978; and 4,066,574, issued Jan. 3, 1978; all to Tamm. These patents are incorporated herein by reference.

Graded Catalyst Zones

The preferred catalyst of this invention may comprise one zone of a multi-zone fixed bed catalyst system. Catalysts in the other zones may be selected for removal of other metals from petroleum feedstock. Such metals, deserving of removal, comprise sodium, vanadium, nickel, and iron. A preferred catalyst for sodium removal is described in U.S. Pat. No. 4,744,888 to Hung et al. and it is incorporated herein by reference. Catalysts of other zones in a multi-zone catalyst system may also be chosen to remove sulfur, nitrogen, and other non-metals.

Graded catalyst beds within such catalyst zones of a multi-zone system are also contemplated. Such catalyst zones will be graded so that the feedstock to be hydroprocessed will contact hydrogen in the presence of a series of more active hydroprocessing catalysts. Thus, grading is done with respect to one or more of the above-discussed parameters of porosity, surface activity, shape, or size to arrive at the desired catalyst activity. At least two catalyst zones are necessary, but more than two may be desirable. For example, high activity catalysts could be mixed with low activity catalysts to create a middle zone of intermediate activity. In such a scheme, the first zone produces a first effluent stream which contacts the second zone, producing in turn a second effluent stream which contacts the third zone, which produces the demetalated effluent. Optionally, the system may also include a zone of desulfurization catalyst that is contacted by the demetalized effluent.

In a two-zone system embodiment of this invention for calcium and sodium removal, we characterize the catalysts for the first zone as having a high volume percent of their pore volume in the form of macropores, a low surface area, and low hydrogenation activity. More particularly the catalyst has a pore volume distribution of at least 5%, preferably at least 15%, and most preferably 20% of its pore volume present in pores having diameters larger than 1000Å or an average mesopore diameter ranging from 100–800Å; and a surface area ranging from about 25 m$^2$/g to about 200 m$^2$/g, preferably from 80 m$^2$/g to about 150 m$^2$/g, and most preferably from about 100 m$^2$/g to about 150 m$^2$/g.

We characterize the catalysts for the second zone as having a pore volume distribution of less than 30%, preferably less than 20%, and most preferably less than 10% of its pore volume present in pores having diameters larger than 1000Å; and an average mesopore diameter ranging from about 80Å to about 400Å, preferably from about 100Å to about 300Å, and most preferably from about 180Å to about 250Å; and a surface area ranging from about 80 m$^2$/g to about 300 m$^2$/g, preferably about 100 m$^2$/g to about 200 m$^2$/g, and most preferably from about 100 m$^2$/g to about 130 m$^2$/g.

In the second zone, the catalytic metals can be Group VIB or Group VIII metals from the Periodic Table according to the 1970 Rules of the International Union of Pure & Applied Chemistry. In particular, we prefer cobalt and nickel as a Group VIII metal, and molybdenum and tungsten as Group VIB metals. We use them singly or in combination, for example, cobalt-molybdenum, cobalt-tungsten, or nickel-molybdenum.

We characterize the second catalysts of this invention as having at least 0.7 wt. %, preferably at least 1.0 wt. % and most preferably at least 1.3 wt. % of a Group VIII metal; and at least 3.0 wt. %, preferably at least 4.0 wt. %, and most preferably at least 6.0 wt. % of a Group VIB metal.

Hydrodemetalating Conditions

In general, hydrodemetalation conditions include temperatures in the range of about 500° F. to about 900° F., preferably about 600° F. to about 800° F., most preferably about 650° F. to about 770° F.; total pressures in the range of about 500 psig to about 3500 psig, preferably from about 1200 psig to about 3000 psig, most preferably from about 1600 psig to about 2800 psig; hydrogen partial pressures in the range of 800 psig to about 2800 psig, preferably about 1000 psig to about 2500 psig, most preferably about 1500 psig to about 2200 psig; and space velocities ranging from about 0.1 to about 6.0, preferably from about 0.5 to about 6.0, most preferably about 0.5 to about 1.7.

We exemplify the present invention below. The example is intended to illustrate a representative embodiment of the catalyst for use in the present invention and results which have been obtained in laboratory analysis. Those familiar with the art will appreciate that other embodiments of the invention will provide equivalent results without departing from the essential features of the invention.

EXAMPLES

The catalyst we used in the test described hereinafter had 40% of its pore volume in the form of macropores greater than 1000 Angstroms in diameter and a surface area of 134 m²/g. It also comprised 2.8 wt. % potassium and its particles were 1/16 inch diameter spheres.

We constructed a fixed catalyst bed containing different types of catalysts for different reactions. We then contacted the catalyst, in the presence of hydrogen with a vacuum residue cut from a double desalted Shengli No. 2 crude oil obtained from the People's Republic of China. Using conventional techniques, we determined the oil's properties as summarized in Table 1.

TABLE 1

| Vacuum Resid Cut Used in Test | | |
| --- | --- | --- |
|  | Feed 1 | Feed 2 |
| LV % 538° C.+ (1000° F.+) | 84 | 85 |
| Sulfur, wt. % | 2.8 | 2.7 |
| Nitrogen, wt. % | 0.84 | 0.85 |
| MCRT, wt. % | 16.0 | 16.0 |
| Hot C7 Asphaltene, wt. % | 5.7 | 5.6 |
| Viscosity, CS 100° C. | 1110 | 1170 |
| API Gravity | 9.9 | 9.5 |
| Metals, ppm | | |
| Ni | 33 | 33 |
| V | 4 | 4 |
| Fe | 18 | 20 |
| Ca | 57 | 19 |
| Na | 10 | 5 |

At these conditions, we find that this system, embodied by the present invention, removes over 40% of the calcium originally present in the vacuum residue cut.

EXAMPLE 1

Preparation of Potassium-Containing Catalyst (Catalyst A)

150 grams of anhydrous gamma alumina having 41% macropores (pores greater than 1000 angstroms) and a surface area of 134 m²/gm (BET) were placed in a plastic bag. Twelve point 1 (12.1) grams of KNO₃ was dissolved in 148 cc distilled water, the water needed to fill the pore volume of the alumina. This solution was sprayed as a fine mist onto the alumina in the plastic bag with mixing. The mixture was tumbled and then allowed to sit for 16 hours. The resulting wet catalyst was placed in a thin layer (½ inch maximum) on a screen bottom tray and heated for 1 hour at 250° F. The dried catalyst was calcined in a muffle furnace at 20 cfh dry air for 6 hours at 200° F., 4 hours at 750° F. and 5 hours at 950° F.

The resulting catalyst was labeled Catalyst A and had about 2.8 wt. % potassium, as measured by X-ray fluorescence.

EXAMPLE 2

Preparation of Comparative Nickel Catalyst (Catalyst B)

In a manner almost identical to Example 1, 1470 grams of the same alumina base was mixed with 149 grams NiNO₃·6H₂O dissolved in 1450 cc water. After drying and calcining, the resulting catalyst was labeled Catalyst B. This catalyst had about 2.0 wt. percent Ni, as measured by ICP. The percent macropores was 41% (by mercury porosimeter) and the surface area was 144 m²/gm (BET). This type of catalyst is described in U.S. Pat. No. 4,741,821, which is incorporated herein by reference.

EXAMPLE 3

Calcium Removal from Feed 1

Feed 1, containing 57 ppm calcium was passed through a mixture of decalcification catalysts in a fixed bed pilot plant prior to a vacuum residue desulfurization (VRDS) catalyst system. A sample of Catalyst A used for analyses (of Example 1) was located 37 volume percent from the demetalation reactor inlet and was surrounded by two catalyst B samples (of Example 2) at 37 and 47 volume percent from the reactor inlet. After 1300 hours on stream, the spent catalysts were removed and analyzed for calcium using a microprobe interval scan. The results are shown in FIG. 1. The operating conditions were in 398°–403° C., 5000 scf/bbl, 2500 psig total pressure (~2000 psia hydrogen partial pressure), 0.58 LHSV, for the demetalation portion of bed.

As can be seen in FIG. 1, Catalyst A, the potassium alumina catalyst allowed for deeper and more uniform penetration of the calcium into the catalyst spheres than did catalyst B, the comparative Ni alumina catalyst.

EXAMPLE 4

Calcium Removal from Feed 2

Feed 2 containing 20 ppm calcium was passed through a mixture of catalyst in a fixed bed pilot plant as in Example 3. A mixture of catalysts A and catalyst B were located in the first 8 volume percent (from the reactor inlet). After 2000 hours on stream, the spent catalysts were removed and analyzed for calcium using a microprobe interval scan. The results shown in FIG. 2 are for catalyst samples located at 18% from the demetalation reactor inlet. Operating conditions were: 367°–374° C. for the catalyst bed, 5000 scf/bbl, 2500 psig total pressure (~2050 psia hydrogen partial pressure), and 1.57 LHSV for the demetalation bed.

As can be seen in FIG. 2, for example, by comparing the area under the two curves, the potassium alumina catalyst had higher calcium levels throughout the catalyst particle, i.e., it was more effective in removing the calcium from the feed.

Calcium and Sodium Removal from Feed

Catalyst C with an average mesopore diameter of 210Å and an average surface area of 120 m²/g comprises 1.5 wt. % cobalt, and 6.5 wt. % molybdenum, and is in the form of 1/32 inch diameter cylinders.

A feed like Feed 1 is passed through a fixed catalyst bed comprising equal volumes of Catalyst A and Catalyst C at the following conditions: 1.68 LHSV, 2500 psig total pressure, 1950 psia hydrogen partial pressure, 5000 SCF/bbl, and 760° F. Catalyst C shows a good sodium distribution, and a higher level of sodium deposition than Catalyst A. Calcium deposition for Catalyst A is significantly deeper than for Catalyst C.

What is claimed is:

1. A process for removing oil-soluble calcium from a hydrocarbon feedstock having at least 1 ppm oil-soluble calcium, using a fixed bed catalyst system, comprising:
    passing said feestock, in the presence of hydrogen, through said system at hydrodemetalating conditions, wherein said system consists essentially of catalyst particles having:
    (a) at least 5 volume percent of their pore volume in the form of macropores above 1000 Angstrom in diameter, or have an average mesopore diameter of 100–800Å.
   (b) a surface area ranging from about 25 m$^2$/g to about 200 m$^2$/g; and
   (c) between 0.2 and 10.0 wt. % of a Group I metal;
wherein said catalyst particles exclude catalytic metals of Group VI and Group VIII, and compounds thereof.

2. A process according to claim 1, wherein said catalyst particles comprise:
   (a) at least 15 volume percent of their pore volume in the form of macropores above 1000 Angstrom in diameter, or have an average mesopore diameter of 200–400Å;
   (b) a surface area ranging from about 80 m$^2$/g to about 150 m$^2$/g; and
   (c) between 1.0 to 5.0 wt. % of a Group I metal.

3. A process according to claim 2, wherein said catalyst particles comprise:
   (a) at least 20 volume percent of their pore volume in the form of macropores above 1000 Angstrom in diameter, or have an average mesopore diameter of 200–400Å;
   (b) a surface area ranging from about 100 m$^2$/g to about 150 m$^2$/g; and
   (c) between 2 and 4 wt. % of a Group I metal.

4. A process according to claim 1, 2, or 3, wherein said Group I metal comprises potassium.

5. A process according to claims 1, 2, or 3 wherein said catalyst is on a support comprising alumina.

6. A process according to claim 5, wherein said alumina comprises transition alumina.

7. A process according to claim 6, wherein said alumina comprise alumina selected from the group consisting of gamma alumina, delta alumina, chi alumina, and eta alumina.

8. A process according to claim 7, wherein said alumina comprises gamma alumina.

9. A process according to claim 1, 2, or 3 wherein the process conditions comprise:
   (a) temperature ranging from about 650° F. to about 770° F.;
   (b) total pressure ranging from about 1600 psig to about 2800 psig;
   (c) hydrogen partial pressure ranging from about 1500 psig to about 2200 psig; and
   (d) space velocity ranging from about 0.5 to about 6.0.

10. A process according to claim 11, 12 or 13 wherein said process conditions comprise:
    (a) temperature ranging from about 650° F. to about 770° F.;
    (b) total pressure ranging from about 1600 psig to about 2800 psig;
    (c) hydrogen partial pressure ranging from about 1500 psig to about 2200 psig; and
    (d) space velocity ranging from about 0.5 to about 6.0.

11. A process for hydrodemetalating a hydrocarbon feedstock having at least 1 ppm oil-soluble calcium and at least 1 ppm oil-soluble sodium, using a graded fixed bed catalyst system, comprising:
    passing said feedstock, in the presence of hydrogen, through said system at hydrodemetalating conditions, and
    wherein the catalyst particles of said system comprise at least a first and a second catalyst zone,
    (a) said first zone consisting essentially of a fixed bed of catalyst particles having at least 5 volume percent of their pore volume in the form of macropores above 1000 Angstrom in diameter, or having an average mesopore diameter of 100–800Å, a surface area ranging from about 25 m$^2$/g to about 200 m$^2$/g, and between 0.2 and 10.0 wt. % of a Group I metal for removal of metal components from said feedstock including said oil-soluble calcium; and
    (b) said second zone consisting essentially of a fixed bed of catalyst particles having less than 20 volume percent of their pore volume in the form of macropores larger than about 1000 Angstrom in diameter, an average mesopore diameter ranging from about 80 Angstrom to about 400 Angstrom, a surface area ranging from about 80 m$^2$/g to about 300 m$^2$/g. and at least 0.7 wt. % of a Group VIII metal, and/or at least 3.0 wt. % of a Group VIB metal for further removal of metal components from said feedstock including said oil-soluble sodium
wherein the catalyst particles of said first zone exclude catalytic metals of Group VI and Group VIII, and compounds thereof.

12. A process, according to claim 11, wherein said first and second catalyst zones are characterized as follows:
    (a) said first zone consisting essentially of a fixed bed of catalyst particles having at least 15 volume percent of their pore volume above 1000 Angstrom in diameter, or having an average mesopore diameter of 200–400Å, a surface area ranging from about 80 m$^2$/g to about 150 m$^2$/g, and between 1.0 to 5.0 wt. % of a Group I metal; and
    (b) said second zone consisting essentially of a fixed bed of catalyst particles having less than 20 volume percent of their pore volume in the form of macropores above 1000 Angstrom in diameter, an average mesopore diameter ranging from about 100 Angstrom to about 300 Angstrom, a surface area ranging from about 100 m$^2$/g to about 200 m$^2$/g, and at least 1.0 wt. % of a Group VIII metal, and/or at least 4.0 wt. % of a Group VIB metal.

13. A process according to claim 12, wherein said first and a second catalyst zone are characterized as follows:
    (a) said first zone consisting essentially of a fixed bed of catalyst particles having at least 20 volume percent of their pore volume above 1000 Angstroms in diameter, or having an average mesopore diameter of 200–400Å, a surface area ranging from about 100 m$^2$/g to about 150 m$^2$/g, and between 2 and 4 wt. % of a Group I metal; and
    (b) said second zone consisting essentially of a fixed bed of catalyst particles having less than 10 volume percent of their pore volume in the form of macropores above 1000 Angstrom in diameter, an average mesopore diameter ranging from 180 Angstrom to about 250 Angstrom, a surface area ranging from about 100 m$^2$/g to about 130 m$^2$/g, and having at least 1.3 wt. % of a Group VIII metal, and/or at least 6.0 wt. % of a Group VIB metal.

14. A process according to claim 11, which further comprises a third catalyst zone characterized as follows:
    said third zone comprising a fixed bed of catalyst particles having desulfurization activity.

15. A process according to claim 11, wherein the Group I metal catalyst of said first zone comprises potassium.

16. A process according to claim 11, wherein the catalyst of said first zone is on a support comprising alumina.

17. A process according to claim 16, wherein said alumina comprises gamma alumina.

18. A process according to claim 11, wherein said hydrocarbon feedstock comprises at least 20 ppm oil-soluble calcium.

19. A process according to claim 18, wherein said hydrocarbon feedstock comprises at least 3 ppm oil-soluble calcium.

20. A process according to claim 11, wherein said hydrocarbon feedstock comprises at least 3 ppm oil-soluble sodium.

21. A process according to claim 20, wherein said hydrocarbon feedstock comprises at least 20 ppm oil-soluble sodium.

22. A process according to any of claims 11, wherein the catalyst particles of said first zone are physically admixed with additional catalyst particles containing Group VIII metals.

* * * * *